United States Patent
Jiang

(10) Patent No.: US 10,198,374 B2
(45) Date of Patent: Feb. 5, 2019

(54) CONFIGURABLE ON-CHIP INTERCONNECTION SYSTEM AND METHOD AND APPARATUS FOR IMPLEMENTING SAME, AND STORAGE MEDIUM

(71) Applicant: SANECHIPS TECHNOLOGY CO., LTD., Shenzhen, Guangdong (CN)

(72) Inventor: Jianping Jiang, Shenzhen (CN)

(73) Assignee: Sanechips Technology Co. Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/527,862

(22) PCT Filed: Apr. 15, 2015

(86) PCT No.: PCT/CN2015/076672
§ 371 (c)(1),
(2) Date: May 18, 2017

(87) PCT Pub. No.: WO2016/078307
PCT Pub. Date: May 26, 2016

(65) Prior Publication Data
US 2018/0143921 A1    May 24, 2018

(30) Foreign Application Priority Data
Nov. 20, 2014    (CN) .......................... 2014 1 0667527

(51) Int. Cl.
*G06F 13/00*    (2006.01)
*G06F 13/16*    (2006.01)
(Continued)

(52) U.S. Cl.
CPC ........ *G06F 13/1678* (2013.01); *G06F 13/364* (2013.01); *G06F 13/38* (2013.01);
(Continued)

(58) Field of Classification Search
CPC .......................... G06F 13/1678; G06F 13/364
See application file for complete search history.

(56) References Cited

U.S. PATENT DOCUMENTS

| | | | |
|---|---|---|---|
| 6,145,019 A | 11/2000 | Firooz | |
| 2008/0215781 A1 | 9/2008 | Lee | |

(Continued)

FOREIGN PATENT DOCUMENTS

| | | |
|---|---|---|
| CN | 1707404 A | 12/2005 |
| CN | 1791219 A | 6/2006 |

(Continued)

OTHER PUBLICATIONS

Supplementary European Search Report in European application No. 15860060.1 dated Nov. 6, 2017, 7 pgs.

(Continued)

*Primary Examiner* — Zachary K Huson
(74) *Attorney, Agent, or Firm* — Cooper Legal Group, LLC

(57) ABSTRACT

A method for implementing a configurable on-chip interconnection system. The method comprises: in an interconnection system, master devices set bit widths of bus identifiers of the master devices, wherein the bit widths of the bus identifiers of the master devices are the same (301); and in a memory access process, the mater devices interact, by means of interconnection matrices only, with slave devices according to the bus identifiers (302). Also provided are a system and apparatus for implementing the method, and a storage medium.

9 Claims, 3 Drawing Sheets

(51) Int. Cl.
  *G06F 13/38* (2006.01)
  *G06F 13/40* (2006.01)
  *G06F 13/42* (2006.01)
  *G06F 13/364* (2006.01)

(52) U.S. Cl.
  CPC ...... *G06F 13/4018* (2013.01); *G06F 13/4022* (2013.01); *G06F 13/4265* (2013.01); *G06F 13/4282* (2013.01)

(56) References Cited

U.S. PATENT DOCUMENTS

| | | | |
|---|---|---|---|
| 2009/0070493 | A1 | 3/2009 | Riocreux |
| 2011/0296066 | A1 | 12/2011 | Xia |
| 2012/0096199 | A1* | 4/2012 | Lee ............ G06F 13/14 710/105 |
| 2012/0311210 | A1 | 12/2012 | Pullagoundapatti |

FOREIGN PATENT DOCUMENTS

| | | |
|---|---|---|
| CN | 101004727 A | 7/2007 |
| CN | 101118788 A | 2/2008 |
| CN | 101853237 A | 10/2010 |
| CN | 101937412 A | 1/2011 |
| CN | 101950279 A | 1/2011 |
| CN | 102096657 A | 6/2011 |
| CN | 102103569 A | 6/2011 |
| CN | 102780628 A | 11/2012 |
| GB | 2452571 A | 3/2009 |
| WO | 03014948 A1 | 2/2003 |

OTHER PUBLICATIONS

International Search Report in international application No. PCT/CN2015/076672 dated Aug. 14, 2015, 2 pgs.
English Translation of the Written Opinion of the International Search Authority in international application No. PCT/CN2015/076672, dated Aug. 14, 2015, 6 pgs.

* cited by examiner

CONFIGURABLE ON-CHIP INTERCONNECTION SYSTEM AND METHOD AND APPARATUS FOR IMPLEMENTING SAME, AND STORAGE MEDIUM

TECHNICAL FIELD

The disclosure relates to a System on Chip (SOC) in the field of communications, and in particular to a configurable on-chip interconnection system, an implementation method and apparatus therefor, and a storage medium.

BACKGROUND

With the continuous progress of a manufacturing process, there are more and more transistors inside a chip, an in-chip system becomes more and more complicated, dozens of or even hundreds of Internet Protocol (IP) cores are integrated usually, and the inter-core communication is one of the main problems of SOC design. The complicated system adopts a shared interconnection system in a standard generally.

In a complicated shared interconnection system, all communications may be converted into storage accesses to each other. The party that sends a storage access request is a master device, and the party that receives the storage access request is a slave device. An SOC is a system for connecting multiple master devices and slave devices.

In the current shared interconnection system, each master device has a bus Identifier (ID). The ID has two functions: 1, for routing when a response to the access request is returned; and 2, due to different IDs, the master devices are enabled to not receive the responses in a sending order, and a matrix or a crossbar may forward requests or responses out of order according to practical conditions when transferring the requests or the responses. The matrix or the crossbar is collectively referred to as an interconnection matrix herein.

However, bit widths of the IDs are increased with progressive increase of interconnection depths, which results in increase of bus protocol overheads, high power consumption and high cost payout. Secondly, interconnection of bus with different ID widths may be implemented by means of ID conversion (ID conversion through an adaptor), so as to result in increase of access delays, influence on design, verification, backend implementation and the like, and adverseness to power consumption and cost control.

SUMMARY

To solve the existing technical problems, the embodiments of the disclosure provide a configurable on-chip interconnection system, an implementation method and apparatus therefor, and a storage medium.

The embodiments of the disclosure provide a method for implementing a high-efficient configurable on-chip interconnection system. The method includes the steps as follows.

In an interconnection system, master devices set bit widths of bus IDs of the master devices, the bit widths of the bus IDs of the master devices being identical; and in a storage access process, the master devices interact, by means of interconnection matrices only, with slave devices according to the bus IDs.

Herein, the step that master devices set bit widths of bus IDs of the master devices may include the steps as follows.

Master devices calculate bit widths of bus IDs of the master devices according to the number of all the master devices in the interconnection system and types of requests that can be sent by the master devices.

Herein, the bit widths of the bus IDs may be expressed as a formula:

$$ID_{WIDTH} = UP\_int\left(\log_2 \sum_{i=n}^{i=0}(i_0 + i_1 + \ldots + i_n)\right),$$

where $ID_{WIDTH}$ represents a bit width of an ID, n represents the number of the master devices in the interconnection system, $i_0$ to $i_n$ represent the number of types of requests that can be sent by each of all the master devices respectively, and UP_int represents rounding up to an integer.

In an embodiment, the method may further include: the master devices configure the types of the requests that can be sent by the master devices.

Herein, the types of the requests that can be sent by the master devices may include one or more of the following: bit width variability in a data transmission process, cacheability, a security level of access to a storage space, and a type of the accessed storage space.

The embodiments of the disclosure also provide a storage medium having stored therein a set of instructions that, when executed, cause at least one processor to perform the above-mentioned operation.

The embodiments of the disclosure also provide a high-efficient configurable on-chip apparatus. The apparatus may be a master device mentioned above. The master device may include: an interface controller and a processor, wherein the interface controller is arranged to set a bit width of a bus ID of the master device, the bit widths of the bus IDs set by the interface controllers in all the master devices being identical; and the processor is arranged to allow the master device to interact, by means of an interconnection matrix only, with a slave device according to the bus ID in a storage access process.

Herein, the operation that the interface controller sets a bit width of a bus ID of each master device may include the steps as follows.

The interface controller calculates a bit width of a bus ID of a master device to which the interface controller pertains according to the number of all the master devices in an interconnection system and types of requests that can be sent by all the master devices.

Herein, the bit width of the bus ID, set by the interface controller, may be expressed as a formula:

$$ID_{WIDTH} = UP\_int\left(\log_2 \sum_{i=n}^{i=0}(i_0 + i_1 + \ldots + i_n)\right),$$

where $ID_{WIDTH}$ represents a bit width of an ID, n represents the number of the master devices in the interconnection system, $i_0$ to $i_n$ represent the number of types of requests that can be sent by each of all the master devices respectively, and UP_int represents rounding up to an integer.

In an embodiment, the interface controller may be further arranged to configure the types of the requests that can be sent by the master device to which the interface controller pertains.

The embodiments of the disclosure also provide a high-efficient configurable on-chip interconnection system. The system may include: a plurality of master devices mentioned above, a plurality of slave devices and a plurality of interconnection matrices.

The embodiments of the disclosure provide the configurable on-chip interconnection system, the implementation method and apparatus therefor, and the storage medium. In the interconnection system, master devices set bit widths of bus IDs of the master devices, the bit widths of the bus IDs of the master devices being identical; and in a storage access process, the master devices interact, by means of interconnection matrices only, with slave devices according to the bus IDs. In the embodiments of the disclosure, the IDs of all the master devices are configured by parameterization. That is, the bit widths of the IDs of all the master devices are configured by parameterization. The bit widths are obtained by adopting the same ID bit width calculation formula, so the ID bit widths of all the master devices are identical, the step of ID conversion is omitted in the storage access process, and an adaptor in the existing interconnection system is correspondingly omitted. Therefore, delays in the existing ID conversion process may be optimized, the protocol overheads of an interconnection bus are correspondingly reduced, the power consumption is reduced, and the cost can be saved. In addition, in system design, the adaptor and ID truncation are not needed, thus saving the design time and facilitating location of a verification problem.

BRIEF DESCRIPTION OF THE DRAWINGS

In the drawings (not necessarily drawn in proportion), similar drawing marks may describe similar parts in different views. The similar drawing marks having different letter suffixes may represent different examples for the similar parts. The drawings substantially show each embodiment discussed herein in an example giving way instead of a limitation way.

DETAILED DESCRIPTION

For convenience, an existing interconnection system adopting an ID bit width increment mode and a communication method therefor will be described hereinbelow.

Figure 1:
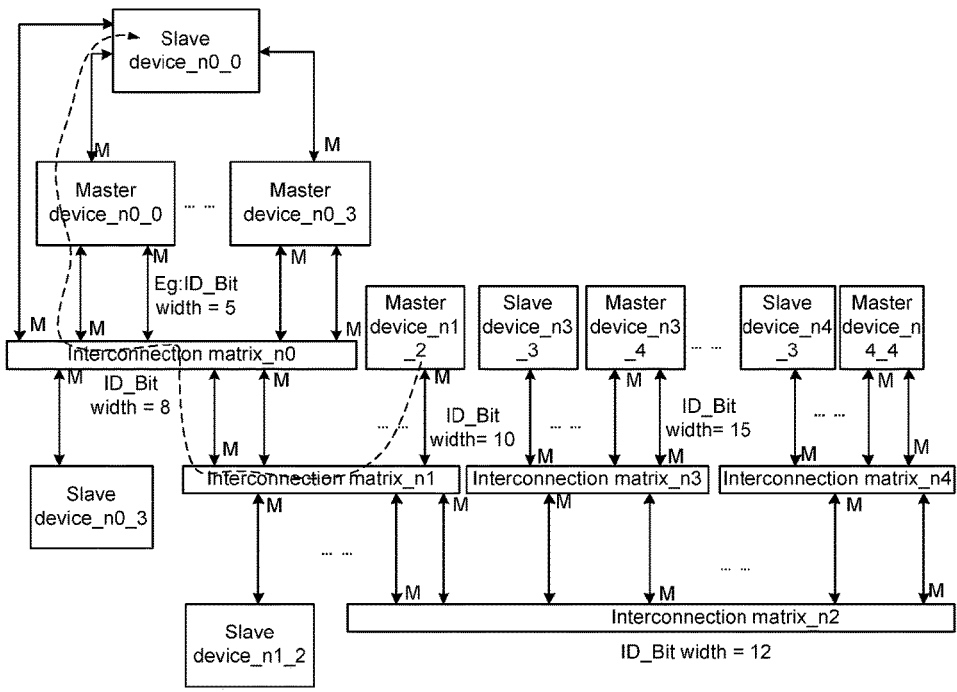
FIG. 1 is a structural diagram of an existing interconnection system adopting an ID bit width increment mode.

Here, a device (that is not limited to the device, and may be a subsystem) connecting buses is referred to as an assembly. M shown in FIG. 1 represents a master device interface, and the other end of a double sided arrow represents a slave device interface; and some of assemblies on the system only have master device interfaces, some only have slave device interfaces, and some contain master and slave device interfaces simultaneously. Interconnection through a matrix or a crossbar is not needed for access to a master device interface of a master device_n0_0. Therefore, the master device_n0_0 does not fall within interconnected master devices.

In all master device interfaces in FIG. 1, it is supposed that the number of different requests sent by the master device_n0_0 is maximum and needs to be represented by a 5-bit ID (an ID bit width is 5), the master device_n0_0 to a slave device_n3_3 are interconnected through four layers of matrices by adopting ID increment type interconnection, and the ID bit width is progressively increased to 15 bits, at least. In the current and future developed SOC, there are at least dozens of or even hundreds of interconnected master devices. Moreover, for convenience of interconnection localization and backend implementation, there may be more than ten interconnection layers, and accordingly the ID bit width will be more increased.

The interconnection system needs to route responses to the master devices by using the IDs. If the ID bit widths are wide, routing time orders are difficult to satisfy, and in a particularly large system, this situation may be the bottleneck of performance. The interconnection system and the slave device need to store non-responded IDs, if the bit widths are wide, hardware overheads for request information storage are high, particularly, caching of larger interconnection matrices and slave devices that do not complete requesting is supported, and the cost is higher. In system design, different layers of ID bit widths are different, ID bit widths need to be converted at some parts, and ID truncation needs to be performed at some other parts, so system access delays are increased, and moreover, time consumption for system integration is high and the verification is relatively difficult as well.

Figure 2:
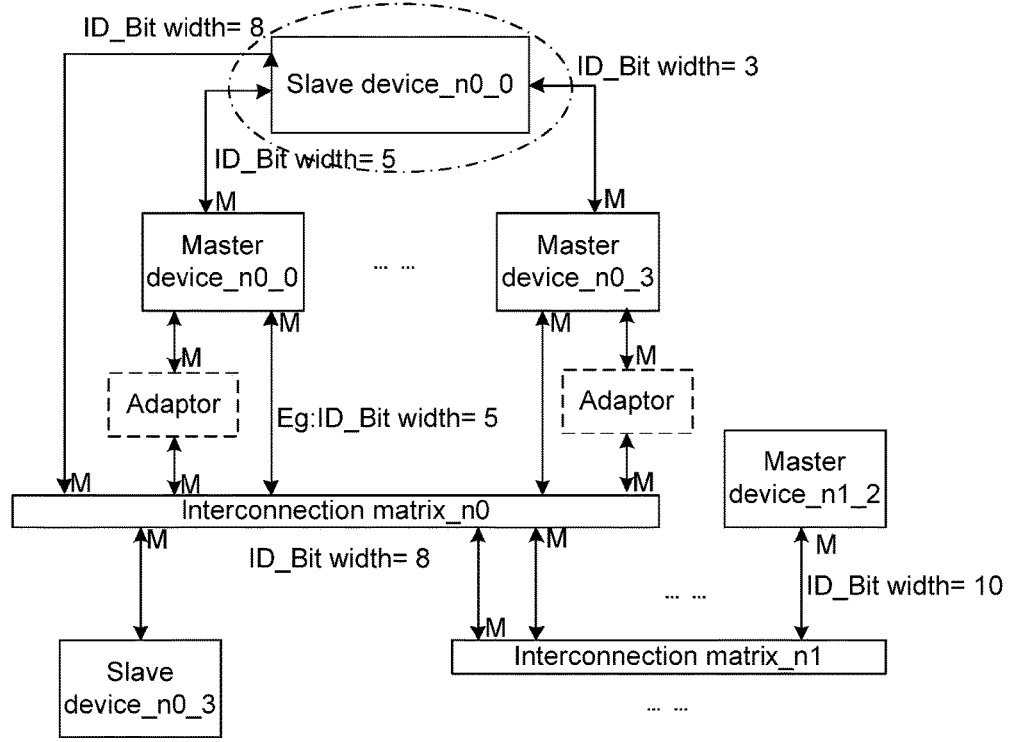
FIG. 2 is a diagram of setting of an adaptor and ID truncation in an existing interconnection system.

As shown in dotted lines in FIG. 1, a master device_n1_2 needs to access a shared storage space in a slave device_n0_0 through the master device_n0_0. The ID bit widths are not matched, the ID bit width of the master device_n1_2 is 10, the ID bit width of a slave device interface on the master device_n0_0 is only 5, and the master device _n1_2 and the master device_n0_0 as well as the slave device_n0_0 can be integrated together by means of conversion of the ID bit widths. As shown in FIG. 2, an adaptor is arranged between the master device_n0_0 and a switching matrix_n0, and the adaptor is mainly used for ID conversion. A queue is used in the ID conversion generally, a queue pointer is used for accessing the ID of the master device_n0_0, after receiving an access request, the adaptor needs to store the ID, and generation of a new queue pointer is delayed for at least one period; and it is necessary to search the queue for the stored ID during response return, and this operation is also delayed for at least one period. That is to say, access delays for at least two periods are wasted during the ID conversion, which is hard to accept by a delay-sensitive system. Hardware overheads for the ID conversion of even a system slightly influenced by the delays are high, and control over cost and power consumption is not facilitated.

In addition, as shown in FIG. 2, ID bit widths (3, 5 and 8) of three master device interfaces connected to three slave device interfaces of the slave device_n0_0 are different, the widest ID (8) should be adopted during design at least, and ID high bits at one side of the slave device are truncated during narrow ID bit width connection. It is easy to make errors during integration, and it is not prone to automatic design by using a tool or a script. Moreover, more problems are caused during verification, so this situation is not applied to a complicated SOC. Therefore, in the embodiments of the disclosure, in the interconnection system, master devices set bit widths of bus IDs of the master devices, the bit widths of the bus IDs of the master devices being identical; and in a storage access process, the master devices interact, by means of interconnection matrices only, with slave devices according to the bus IDs.

The disclosure will be further described in detail hereinbelow with the drawings and specific embodiments.

Figure 3:
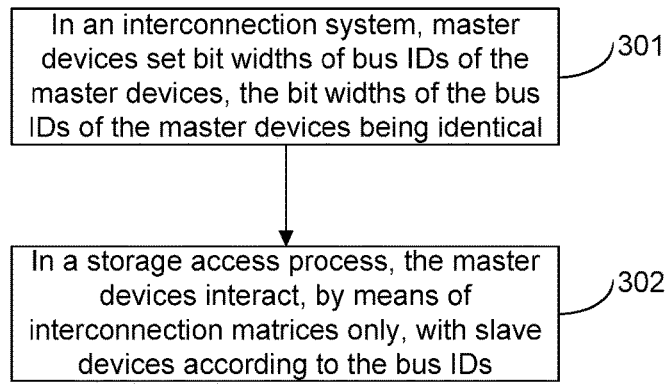
FIG. 3 is an implementation flowchart of a method for implementing a high-efficient configurable on-chip interconnection system according to an embodiment of the disclosure.

FIG. 3 is an implementation flowchart of a method for implementing a high-efficient configurable on-chip interconnection system according to an embodiment of the disclosure. As shown in FIG. 3, the method includes the steps 301-302 as follows.

In Step 301, in an interconnection system, master devices set bit widths of bus IDs of the master devices, the bit widths of the bus IDs of the master devices being identical. That is, bus IDs of different master devices are represented by identical bit widths.

Here, a storage access request is always sent, according to a data stream for storage access, from a master device to a slave device through multi-layer bus interconnection; and then, a response returned by the slave device is returned to the master device according to a transmission path of the request. That is to say, only the master device needs to access the ID, and identification of the slave device is completed by address decoding.

In the embodiments of the disclosure, IDs are configured uniformly in the interconnection system, bit widths of the IDs depend on the number of all master devices needing to be interconnected on the system and the number of types of requests that can be sent by each master device, so as to ensure that the master device can still send requests out of order under this solution. Correspondingly, the step that master devices set bit widths of bus IDs of the master devices includes the steps as follows.

Master devices calculate bit widths of bus IDs of the master devices according to the number of all the master devices in the interconnection system and types of requests that can be sent by the master devices.

Herein, the bit widths of the bus IDs may be expressed as a formula:

$$ID_{WIDTH} = \text{UP\_int}\left(\log_2 \sum_{i=n}^{i=0}(i_0 + i_1 + \ldots + i_n)\right),$$

where $ID_{WIDTH}$ represents a bit width of an ID, n represents the number of the master devices in the interconnection system, $i_0$ to $i_n$ represent the number of types of requests that can be sent by each of all the master devices respectively, and UP_int represents rounding up to an integer.

It can be seen that the bit widths of the IDs of all the master devices in the embodiments of the disclosure are identical by calculation through the above-mentioned formula.

In the embodiments of the disclosure, the bit widths of the IDs are consistent in the whole system, and the number (REQ_NUM) of types of requests that can be sent by each master device depends on the master device per se. For example, the REQ_NUM of a processor that supports out-of-order execution may be relatively large; and the REQ_NUM of an accelerator or a dedicated interface is 1 under most circumstances. The parameter is set at a top layer in SOC design, and during instantiation of a device or a subsystem, the parameter is arranged into a corresponding device or subsystem.

In Step 302, in a storage access process, the master devices interact, by means of interconnection matrices only, with slave devices according to the bus IDs.

Figure 5:
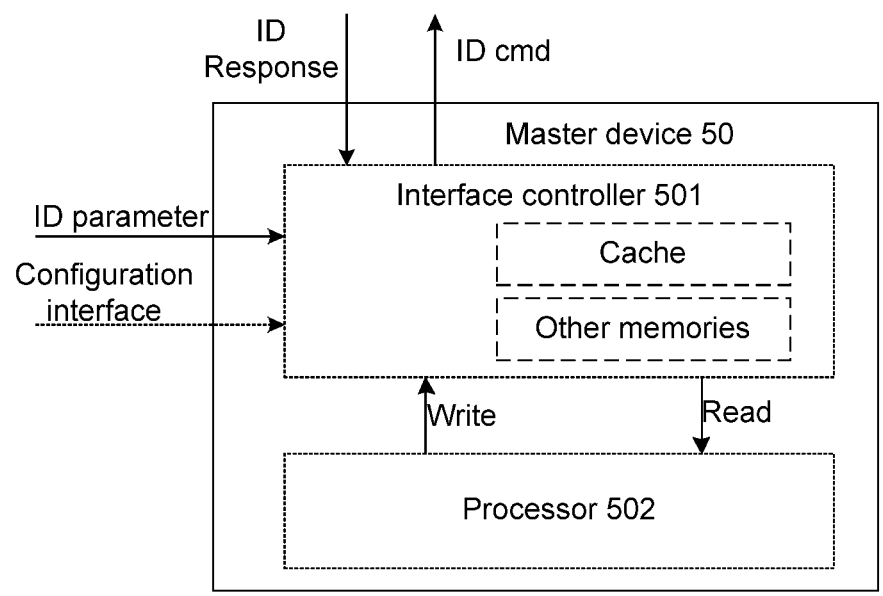
FIG. 5 is a structural diagram of a master device according to an embodiment of the disclosure.

In the embodiments of the disclosure, as shown in FIG. 5, a storage access control mode of a processor master device is stored in a cache and may be configured through a processor core; a storage access control mode of a non-processor master device is stored in other memories and may be configured through a configuration interface; the bit width of the ID of the master device and the request are transferred to a top layer of a specific slave device module through parameters; and the slave device interacts with the master device by parsing a memory access address from an interconnection matrix, and does not perform truncation or processing on the ID of the master device or the interconnection matrix.

In the embodiments of the disclosure, the IDs of all the master devices are configured by parameterization. That is, the bit widths of the IDs of all the master devices are configured by parameterization. The bit widths are obtained by adopting the same ID bit width calculation formula, so the ID bit widths of all the master devices are identical, the step of ID conversion is omitted in the storage access process, and an adaptor in the existing interconnection system shown in FIG. 2 is correspondingly omitted. Therefore, delays in the existing ID conversion process may be optimized, the protocol overheads of an interconnection bus are correspondingly reduced, the power consumption is reduced, and the cost can be saved. In addition, in system design, the adaptor and ID truncation are not needed, thus saving the design time and facilitating location of a verification problem.

In an embodiment of the disclosure, the method further includes: the master devices configure the types of the requests that can be sent by the master devices, the types of the requests that can be sent by the master devices being identical.

The types of the requests of different master devices are uniformly configured, that is, the types of the requests are identical, so truncation and caching for the bit widths of the IDs performed between different layers of matrices may be reduced, the delays are reduced, the time order risk is reduced, and the probability of integration errors is reduced.

Here, the configuration may be completed by the master devices themselves, mainly directing to a processor core, or may be automatically completed by a Translation Lookaside Buffer (TLB) in a processor. For a non-processor core, a configuration process and other configurations of the master devices are carried out together through dedicated configuration interfaces, such as Direct Memory Access (DMA) interfaces, in the master devices.

Herein, the types of the requests that can be sent by the master devices may include one or more of the following:

bit width variability in a data transmission process, cacheability, a security level of access to a storage space, a type of the accessed storage space, and the like. The bit width variability in a data transmission process represents that bus data has different bit width access requests under different scenarios, for example, data having 128-bit data bit widths is transmitted under a large data traffic access scenario, and data having 8-bit data bit widths is transmitted under a small data traffic access scenario. The cacheability represents that data needs to be aligned in a transmission process according to requirements of some algorithms, time orders, etc., and needs to be cached. The security level of access to a storage space represents that data accesses to some address spaces have access control functions, the data may be accessed after set conditions are satisfied, and the set conditions may be address filter or may be a functional scenario. The type of the accessed storage space represents that the accessed storage space may be a data access space, an instruction access space, a readable-writable access space, a read-only access space, etc.

In the embodiments of the disclosure, each master device may select to send one or more storage access requests, and may also select to support all the above-mentioned storage access requests. For example, after sending a request, a master device is in a waiting state until receiving a response from a slave device, the storage access belonging to a strong order type. Some master devices may support or even only support the storage access of this type.

Certainly, the possibility of other configurations is not excluded. For example, a complicated master device needs to count or control request traffics, and master device waiting timeout is resulted in.

The embodiments of the disclosure also provide a storage medium. The storage medium includes a set of instructions. When the instructions are executed, at least one processor is initiated to perform the above-mentioned operation.

The method in the embodiments of the disclosure will be described hereinbelow with a specific application scenario.

Figure 4:
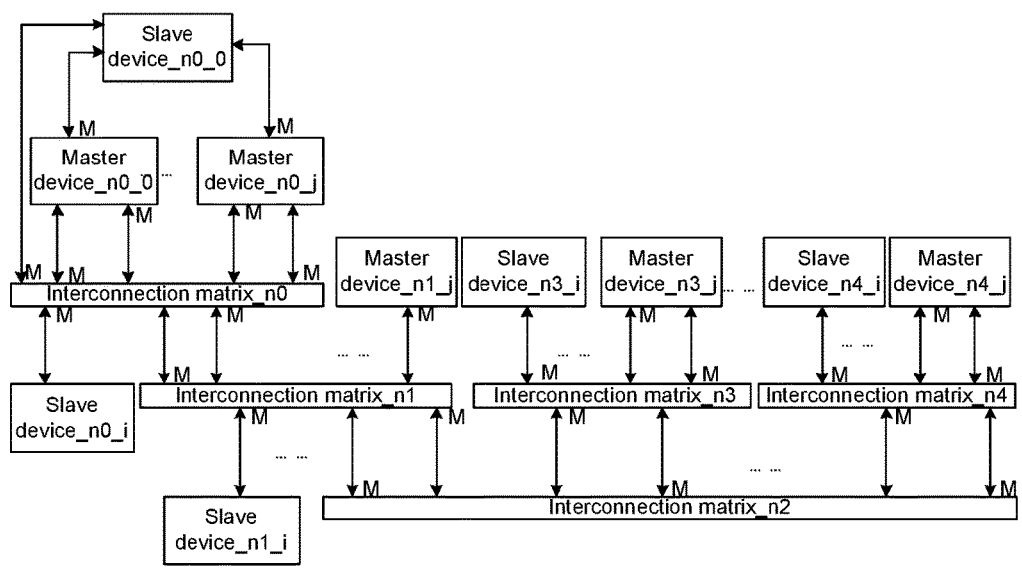
FIG. 4 is a structural diagram of a configurable on-chip interconnection system in a specific application scenario according to the disclosure.

In FIG. 4, interconnection of five interconnection matrices is taken as an example (the types and number of the interconnection matrices are not limited). If a master device_n1_j needs to access a shared storage space in a slave device_n0_0 through a master device_n0_0, it is unnecessary to convert IDs due to no change of bit widths of the IDs during interconnection. Therefore, the bit widths of the IDs have nothing to do with interconnection layers, and the interconnection of the whole system is quite simple and balanced. The balance here refers to time order balance, all interconnected IDs are consistent, and the problem about time orders will not be caused due to a certain interconnection matrix during ID comparison. In addition, truncation is no longer needed for the IDs, a storage control signal does not need to be changed, integration is even completely instrumentalized, and the risk of problem occurring due to manual operation is reduced.

The embodiments of the disclosure also provide a high-efficient configurable on-chip apparatus. As shown in FIG. 5, the apparatus is a master device mentioned above. The master device 50 includes: an interface controller 501 and a processor 502.

The interface controller 501 is arranged to set a bit width of a bus ID of the master device, the bit widths of the bus IDs set by the interface controllers in all the master devices being identical.

The interface controller 501 includes a cache and other memories, and is arranged to store memory access control and configuration parameters, store memory access control and configuration parameters of a processor master device in a memory, and store memory access control and configuration parameters of a non-processor master device in other memories. The interface controller 501 is connected to a configuration interface and receives an ID response, returned from a slave device, of an ID of the corresponding master device, the ID response being a feedback signal about read or write completion. The master device sends an ID cmd associated with the ID, where the cmd may be read or write.

The processor 502 is arranged to allow the master device to interact, by means of an interconnection matrix only, with a slave device according to the bus ID in a storage access process.

Here, a storage access request is always sent, according to a data stream for storage access, from a master device to a slave device through multi-layer bus interconnection; and then, a response returned by the slave device is returned to the master device according to a transmission path of the request. That is to say, only the master device needs to access the ID, and identification of the slave device is completed by address decoding.

In the embodiments of the disclosure, IDs are configured uniformly in the interconnection system, bit widths of the IDs depend on the number of all master devices needing to be interconnected on the system and the number of types of requests that can be sent by each master device, so as to ensure that the master device can still send requests out of order under this solution.

In an embodiment of the disclosure, the operation that the interface controller 501 sets a bit width of a bus ID of each master device includes the steps as follows.

The interface controller calculates a bit width of a bus ID of a master device to which the interface controller pertains according to the number of all the master devices in an interconnection system and types of requests that can be sent by all the master devices.

In an embodiment of the disclosure, the bit width of the bus ID, set by the interface controller 501, is expressed as a formula:

$$ID_{WIDTH} = \text{UP\_int}\left(\log_2 \sum_{i=n}^{i=0}(i_0 + i_1 + \ldots + i_n)\right),$$

where $ID_{WIDTH}$ represents a bit width of an ID, n represents the number of the master devices in the interconnection system, $i_0$ to $i_n$ represent the number of types of requests that can be sent by each of all the master devices respectively, and UP_int represents rounding up to an integer.

It can be seen that the bit widths of the IDs of all the master devices in the embodiments of the disclosure are identical by calculation through the above-mentioned formula.

In the embodiments of the disclosure, the bit widths of the IDs are consistent in the whole system, and the number (REQ_NUM) of types of requests that can be sent by each master device depends on the master device. For example, the REQ_NUM of a processor that supports out-of-order execution may be relatively large; and the REQ_NUM of an accelerator or a dedicated interface is 1 under most circumstances. The parameter is set at a top layer in SOC design, and during instantiation of a device or a subsystem, the parameter is configured into a corresponding device or subsystem.

In the embodiments of the disclosure, the IDs of all the master devices are configured by parameterization. That is, the bit widths of the IDs of all the master devices are configured by parameterization. The bit widths are obtained by adopting the same ID bit width calculation formula, so the ID bit widths of all the master devices are identical, the step of ID conversion is omitted in the storage access process, and an adaptor in the existing interconnection system shown in FIG. 2 is correspondingly omitted. Therefore, delays in the existing ID conversion process may be optimized, the protocol overheads of an interconnection bus are correspondingly reduced, the power consumption is reduced, and the cost can be saved. In addition, in system design, the adaptor and ID truncation are not needed, thus saving the design time and facilitating location of a verification problem.

In an embodiment of the disclosure, the interface controller 501 is further arranged to configure the types of the requests that can be sent by the master device to which the interface controller pertains.

The embodiments of the disclosure also provide a high-efficient configurable on-chip interconnection system. Referring to FIG. 4, the system includes: a plurality of master devices mentioned above, a plurality of slave devices and a plurality of interconnection matrices.

A configuration interface shown in FIG. 5 does not fixedly limit the structure, and a certain fixed protocol is not limited.

Here, the configuration may be completed by the master devices themselves, mainly directing to a processor core, or may be automatically completed by a TLB in a processor. For a non-processor core, a configuration process and other configurations of the master devices are carried out together through dedicated configuration interfaces, such as DMA interfaces, in the master devices.

Herein, the types of the requests that can be sent by the master devices may include one or more of the following: bit width variability in a data transmission process, cacheability, a security level of access to a storage space, a type of the accessed storage space, and the like.

The bit width variability in a data transmission process represents that bus data has different bit width access requests under different scenarios, for example, data having 128-bit data bit widths is transmitted under a large data traffic access scenario, and data having 8-bit data bit widths is transmitted under a small data traffic access scenario. The cacheability represents that data needs to be aligned in a transmission process according to requirements of some algorithms, time orders, etc., and needs to be cached. The security level of access to a storage space represents that data accesses to some address spaces have access control functions, the data may be accessed after set conditions are satisfied, and the set conditions may be address filter or may be a functional scenario. The type of the accessed storage space represents that the accessed storage space may be a data access space, an instruction access space, a readable-writable access space, a read-only access space, etc.

In the embodiments of the disclosure, each master device may select to send one or more storage access requests, and may also select to support all the above-mentioned storage access requests. For example, after sending a request, a master device is in a waiting state until receiving a response from a slave device, the storage access belonging to a strong order type. Some master devices may support or even only support the storage access of this type.

Certainly, the possibility of other configurations is not excluded. For example, a complicated master device needs to count or control request traffics, and master device waiting timeout is resulted in.

In the embodiments of the disclosure, each master device may select to send one or more storage access requests, and may also select to support all the above-mentioned storage access requests. For example, after sending a request, a master device is in a waiting state until receiving a response from a slave device, the storage access belonging to a strong order type. Some master devices may support or even only support the storage access of this type.

Certainly, the possibility of other configurations is not excluded. For example, a complicated master device needs to count or control request traffics, and master device waiting timeout is resulted in.

Those skilled in the art shall understand that the embodiments of the disclosure may be provided as a method, a system or a computer program product. Thus, forms of hardware embodiments, software embodiments or embodiments integrating software and hardware may be adopted in the disclosure. Moreover, a form of the computer program product implemented on one or more computer available storage media (including, but are not limited to, a disk memory, an optical memory and the like) containing computer available program codes may be adopted in the disclosure.

The disclosure is described with reference to flowcharts and/or block diagrams of the method, the device (system) and the computer program product according to the embodiments of the disclosure. It will be appreciated that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, such that a manufactured product including an instruction apparatus is generated via the instructions stored in the computer readable memory, and the instruction apparatus implements the functions designated in one or more flows of the flowcharts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flowcharts and/or one or more blocks of the block diagrams.

The above is only the preferred embodiments of the disclosure and not intended to limit the scope of protection of the disclosure.

What is claimed is:

1. A method for implementing a high-efficient configurable on-chip interconnection system, comprising:
   setting, by master devices in an interconnection system, bit widths of bus Identifiers (IDs) of the master devices, the bit widths of the bus IDs of the master devices being identical; and in a storage access process, interacting, by the master devices via interconnection matrices only, with slave devices according to the bus IDs;
   wherein setting, by master devices, bit widths of bus IDs of the master devices comprises:
   calculating, by the master devices, the bit widths of the bus IDs of the master devices according to the number of all the master devices in the interconnection system and types of requests that can be sent by the master devices.

2. The method according to claim 1, wherein the bit widths of the bus IDs are expressed as a formula:

$$ID_{WIDTH} = \text{UP\_int}\left(\log_2 \sum_{i=n}^{i=0}(i_0 + i_1 + \ldots + i_n)\right),$$

where $ID_{WIDTH}$ represents a bit width of an ID, n represents the number of the master devices in the interconnection system, $i_0$ to $i_n$ represent the number of types of requests that can be sent by each of all the master devices respectively, and UP_int represents rounding up to an integer.

3. The method according to claim 1, further comprising: configuring, by the master devices, the types of requests that can be sent by the master devices.

4. The method according to claim 3, wherein the types of the requests that can be sent by the master devices comprise one or more of the following:
bit width variability in a data transmission process, cacheability, a security level of access to a storage space, or a type of the accessed storage space.

5. A high-efficient configurable on-chip apparatus, the apparatus being a master device, the master device comprising: an interface controller and a processor,
wherein the interface controller is arranged to set a bit width of a bus Identifier (ID) of the master device, bit widths of bus IDs set by interface controllers in all master devices in an interconnection system being identical; and
the processor is arranged to allow the master device to interact, by means of an interconnection matrix only, with a slave device according to the bus ID in a storage access process;
wherein the interface controller is further arranged to calculate the bit width of the bus ID of the master device to which the interface controller pertains according to the number of all the master devices in the interconnection system and types of requests that can be sent by all the master devices.

6. The apparatus according to claim 5, wherein the bit width of the bus ID, set by the interface controller, is expressed as a formula:

$$ID_{WIDTH} = \text{UP\_int}\left(\log_2 \sum_{i=n}^{i=0}(i_0 + i_1 + \ldots + i_n)\right),$$

where $ID_{WIDTH}$ represents a bit width of an ID, n represents the number of the master devices in the interconnection system, $i_0$ to $i_n$ represent the number of types of requests that can be sent by each of all the master devices respectively, and UP_int represents rounding up to an integer.

7. The apparatus according to claim 5, wherein the interface controller is further arranged to configure the types of the requests that can be sent by the master device to which the interface controller pertains.

8. A high-efficient configurable on-chip interconnection system, comprising: a plurality of master devices according to claim 5, a plurality of slave devices and a plurality of interconnection matrices.

9. A non-transitory storage medium having stored therein a set of instructions that, when executed, cause at least one processor to perform a method for implementing a high-efficient configurable on-chip interconnection system, the method comprising:
setting, by master devices in an interconnection system, bit widths of bus Identifiers (IDs) of the master devices, the bit widths of the bus IDs of the master devices being identical; and in a storage access process, interacting, by the master devices via interconnection matrices only, with slave devices according to the bus IDs;
wherein setting, by master devices, bit widths of bus IDs of the master devices comprises:
calculating, by the master devices, the bit widths of the bus IDs of the master devices according to the number of all the master devices in the interconnection system and types of requests that can be sent by the master devices.

* * * * *